UNITED STATES PATENT OFFICE.

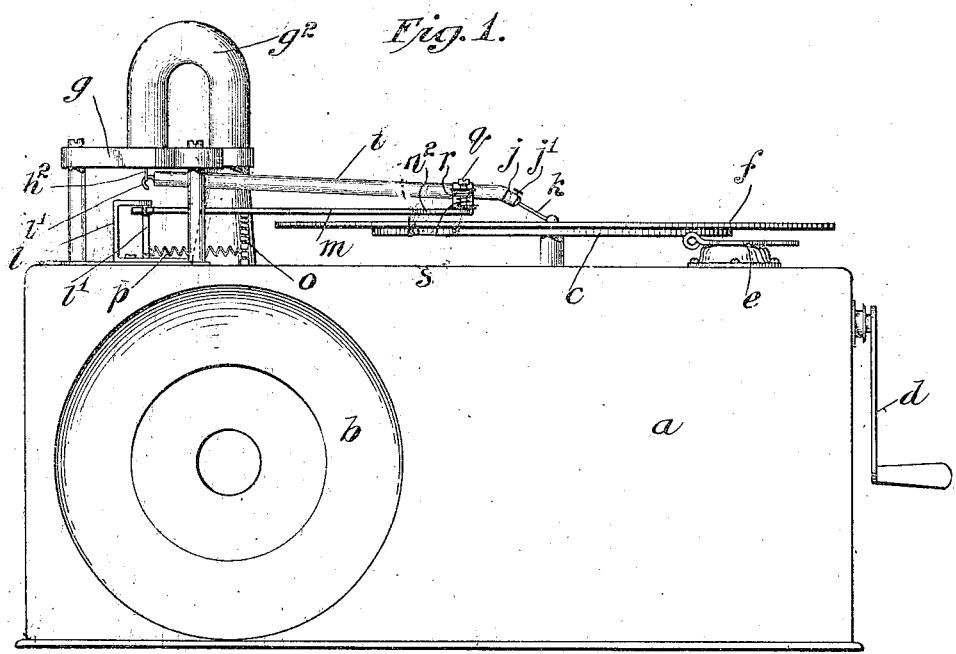
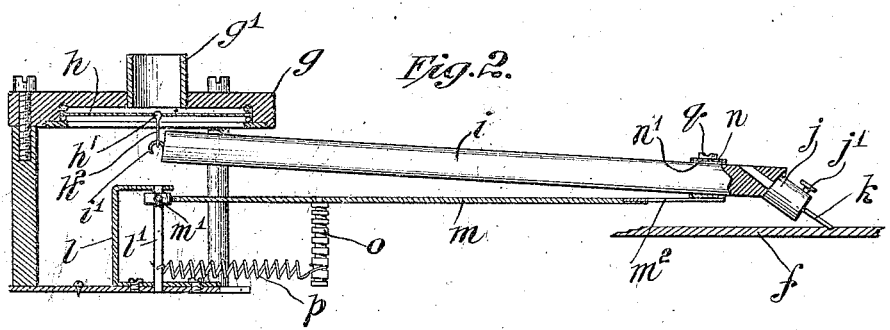
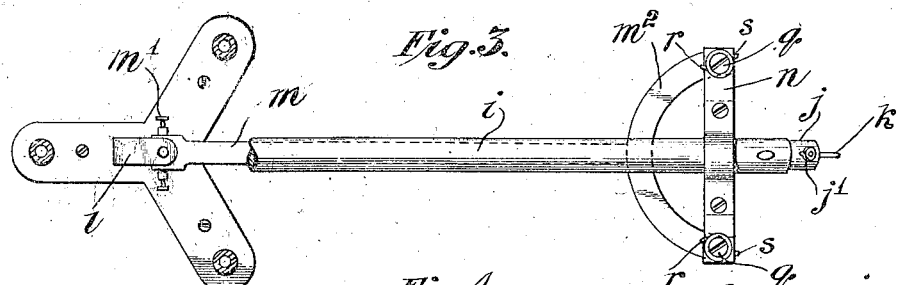
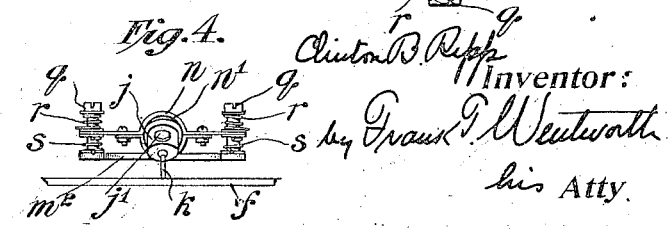

CLINTON B. REPP, OF NEW YORK, N. Y.

PHONOGRAPH.

1,146,519. Specification of Letters Patent. Patented July 13, 1915.

Application filed December 23, 1910. Serial No. 598,940.

*To all whom it may concern:*

Be it known that I, CLINTON B. REPP, a citizen of the United States, residing in the borough of Manhattan, in the city, county, and State of New York, have invented certain new and useful Improvements in Phonographs, of which the following is a specification, reference being had therein to the accompanying drawings, which form a part thereof.

My invention relates to phonographs and more particularly to the means for transmitting sound vibrations from the record to the diaphragm.

The main object of my invention is to provide a phonograph embodying therein a transmitter or vibrator member without a pivotal support intermediate the ends thereof, the ends of said transmitter or vibrator member being respectively adapted to apply pressure to the diaphragm and to support a producer point, the means applying such pressure permitting said member or arm to be projected over a disk record.

A further object is to provide a phonograph wherein the sound vibrations will be transmitted from the record to the diaphragm through a transmitter or vibrator member and pressure will be exerted upon said arm at a single point to simultaneously tension the diaphragm and cause that intimate contact between the reproducer point and the record which is desirable to induce in said transmitter vibrations corresponding with all of the sound waves indicated upon a record.

A still further object is to provide in conjunction with an apparatus having the characteristics referred to immediately above, means for regulating the pressure exerted by the tensioning member or mechanism.

A still further object is to provide a phonograph of this type wherein the tensioning means will exert a predetermined, proportionate pressure upon the reproducer point and upon the diaphragm.

A still further object is to provide a phonograph of the character described wherein the pressure on the diaphragm may be varied without varying the pressure upon the reproducer point.

A still further object is to provide a phonograph embodying therein a transmitter or vibrator member subjected to pressure acting toward the record and away from the diaphragm, by means of a rigid, swiveling controlling arm, said transmitter being connected to, or supported from, said controlling arm in a manner to avoid any interference with the vibrations passing through said transmitter or vibrator member, or the presence of a fulcrum about which said member oscillates in following the vertical undulations of the record.

A still further object is to provide a phonograph of this character wherein the volume of reproduced sound may be augmented by merely adjusting the stylus or reproducer point. And a still further object is to provide a phonograph embodying therein a transmitter or vibrator member to which pressure is applied by a rigid controlling rod connected therewith in a manner to avoid interference with the free vibrations of said transmitter or vibrator arm or member, said controlling arm being free to have vertical movement with the undulations upon a record and to have lateral movement to permit the stylus or reproducer point to track in the spiral formed by the indicated sound waves of said record.

The invention consists in the novel features of construction and combination of parts as are hereinafter set forth and described, and more particularly pointed out in the claims hereto appended.

Referring to the drawings:—Figure 1 is a side elevation of a phonograph embodying my invention; Fig. 2 is a detailed view, partly in elevation and partly in section, of the sound transmitter and reproducing mechanisms only; Fig. 3 is a plan view of the transmitter or vibrator member and its controlling and supporting arm, one end of said transmitter or vibrator member being broken away to disclose in detail the mechanism thereunder; and Fig. 4 is a front view of the forward end of the transmitter or vibrator member, illustrating the manner of attachment of said member to its controlling arm, and the details of the mount for the stylus or reproducer point.

Like letters refer to like parts throughout the several views.

In the embodiment of my invention shown in the accompanying drawings, *a* indicates the casing of an ordinary stand having mounted therein a horn *b*. Rotatably mounted upon the top of this stand is the record table *c* of the usual construction and driven by any desired type of motor not shown. At *d* I have shown the motor winding crank and at $e$ the brake or retard member acting on the table $c$.

The type of machine shown is especially adapted for use with a disk record, shown at $f$, a type of record requiring considerable clearance about the table $c$ to permit the application of the reproducer point to the record at the proper diameter of the record, and cause the said point to track properly in, and respond properly to, the spiral indicating sound waves.

In my present invention, I use a fixed sound box $g$ mounted in a frame spaced away from the table $c$, which box has an outlet nipple $g'$ communicating with the horn $b$ through the U-shaped tube $g^2$, a construction permitting the course of the sound waves to be reversed, and their projection into the said amplifier or horn, $b$. This construction is preferred and is incidental to that simultaneous tensioning of the diaphragm and the application of pressure to the record, which will be referred to hereinafter.

Mounted in the sound box $g$ in the usual and well known manner, is a flexible diaphragm $h$ adapted to have transmitted thereto vibrations as indicated by a record and to develop sound waves corresponding to such vibrations, in the usual and well known manner. This diaphragm, to secure sensibility and avoid residuary vibrations, is placed under a constant and substantially uniform tension by pressure or stress applied thereto through the stud $h'$ mounted axially thereof.

Those sound vibrations resulting in the development of sound waves by the diaphragm are transmitted to said diaphragm through the vibrator member $i$, preferably composed of a close grained wood, or one having substantially no grain, such as bass wood, the transmission of the vibrations being through the body of this member as distinguished from the mechanical oscillations of the member about a fulcrum or pivots intermediate the stylus or reproducer point and the diaphragm, which is the construction now commonly used. I have found in practice that the employment of a wooden member, such as I have described not only results in the transmission with accuracy of all of the sound waves indicated upon the record, but in such transmission in a manner to avoid the presence of cross vibrations due to secondary vibrations set up in the member by the primary vibrations passing along same. This results in purity and softness in the reproduced tones or sounds, avoiding all of those blasts or overtones common in phonographs.

One end of the vibrator or transmitting member $i$ carries a metallic open loop $i'$ adapted to pass through and engage a loop $h^2$ connected with the stud $h'$, which loop $h^2$ forms a part of the conducting system for the sound vibrations. Preferably it is composed of a silken cord or thread and is itself placed in tension through the same pressure or stress resulting in the tensioning of the diaphragm. This construction not only permits the sound vibrations to be transmitted to the diaphragm but also permits the vertical and lateral oscillations of the vibrator or transmitter member $i$ in following the vertical undulations and the spiral trend of the indicated sound waves on the record.

Rigidly secured to the free end of the member $i$ is a metallic mount $j$ which projects downwardly and forwardly of said member to give the proper line of projection to the stylus or reproducer point $k$, secured in said mount by means of an axial opening therein and a set screw $j'$ carried thereby. This construction not only permits the substitution of a fresh point at any time, but also permits the regulation of the extent of projection of the point with a resultant variance in the pressure thereof upon the record and increase in the intensity of the sound vibrations and the volume of reproduced sound.

To secure that pressure or stress required to tension the diaphragm and secure the requisite intimate contact of the point $k$ with the record, it is essential that this pressure be applied through the vibrator or transmitter member $i$ in a manner to avoid the presence of a fulcrum along the length of said member and to eliminate any possibility of interference with the vibrations passing through said member to the diaphragm.

In carrying out my invention, I provide a frame $l$ in which is mounted by means of a universal joint, a supporting or controlling arm $m$ extending radially of the diaphragm immediately below the member $i$ which arm is preferably composed of flat metal stock. The universal joint above referred to consists of a vertical pivot $l'$ alined with the axis of the diaphragm $h$, which pivot is straddled by the forked end of the arm $m$ and has point bearings formed therein coöperating with pivot screws $m'$ carried by the member $m$, the axis of said pivot screws being perpendicular to the axis of said pivot $l$. This universal joint transmits the movement of the arm $m$ in any direction and thus also permits the vibrator or transmitter member $i$, under the control of the record and said arm, to have that lateral traverse necessary during the reproduction of sound from a disk record.

The outer end of the arm $m$ is provided with a yoke $m^2$ on the divergent arms of which is mounted a split collar plate $n$ encircling the member $i$ adjacent to the mount $j$. That portion of the plate $n$ inclosing the member $i$ is provided with a flexible pad $n'$ to prevent the transmission of vibrations from said member to said collar, said plate being made in two sections to facilitate its application to, or removal from said member.

Pendant from the arm $m$ intermediate the pivot $l'$ and the yoke $m^2$, and nearer the former, is a post $o$ having the two-fold function of serving as a rest for the transmitter to prevent the engagement of the stylus $k$ with the table $c$, and as an offset connection for the spring $p$ to secure leverage in the application of the power exerted by said spring in imparting the requisite pressure through said arm upon the transmitter member $m$. The other end of the spring $p$ is attached to the pivot $l'$ although, if desired, it may be attached at any other point in substantial alinement with the axis of said diaphragm.

To permit a variance in the pressure upon the diaphragm and stylus or reproducer point, I provide the post $o$ with graduated notches, as shown in the drawings, thus permitting the variance of the leverage at which said spring acts, with a resultant increase of diminution of the pressure. This adjustment permits the machine to be adapted for either parlor or concert use by a mere adjustment of the tension of the diaphragm and the pressure on the record.

In phonographs, it is desirable, in order to minimize wear upon the record, to apply only sufficient pressure to the stylus or reproducer point to insure the required constant intimate contact between said point and the record, and in that machine made the subject matter of this application, I prefer to embody supplemental adjustment means whereby the tension on the diaphragm exerted by the spring $p$ may be increased or diminished without varying the pressure on the stylus or reproducer point caused by said spring. To accomplish this result, I mount the plate $n$ upon the yoke $m^2$ by means of adjustable screws $q$, spiral springs $r$ being interposed between the head of said screws and the plate $n$ and spiral springs $s$ being interposed between the plate $n$ and the yoke $m^2$. These springs encircle the screws $q$, and the lower free ends of the springs $r$ bear upon the rear edge of the plate $n$, while the lower free ends of the springs $s$ bear upon the forward edge of the yoke $m^2$ so that the tensioning of these springs will result in a tilting action of the plate $n$ as to the edge thereof toward the diaphragm $h$, thus resulting in the application of supplemental pressure upon said arm toward said diaphragm, the pressure upon the stylus or reproducer point $k$ not being modified in any way by this action.

By the construction herein described, I am not only enabled to reproduce sound waves with a stationary diaphragm, but am enabled to arrange the diaphragm in a disk machine upon a plane parallel with the plane upon which the record rotates, and am thus enabled to simultaneously apply pressure to the record and to the diaphragm through the same agencies.

The operation of the herein described device is substantially as follows:—The table $c$ is set in motion in the usual and well known manner, and the point $k$ brought into engagement with the indicated sound waves upon a disk record by raising the vibrator or transmitter member and swiveling it and its controlling arm $m$ about the axis of the diaphragm and the pivot $l'$. The movement of the record causes the indicated sound waves thereon to impart to the vibrator or transmitter member $i$ sound vibrations corresponding in number and frequency to those indicated upon the record. The slight up and downward movement, or vertical oscillation of the member $i$ is about an axis fixed axially below the diaphragm, so that any vibrations passing to the diaphragm must be independent of this up and down movement. These vibrations must therefore pass through the member $i$ and the tension member $h^2$ to the diaphragm which at all times is subjected to constant pressure as determined by the tension of the spring $p$ or by such tension supplemented by that of the springs $r$—$s$. This pressure being applied to the diaphragm through the member $i$, not only results in a sound conductor system, all parts of which are synthesized, but also results in a constant tendency of the diaphragm to return to normal, thus eliminating residuary vibrations in said diaphragm and limiting the flexure thereof to correspond only with the vibrations passing thereto through the members $i$ and $h^2$. A diaphragm so tensioned is very sensitive and is responsive to minute vibrations, thus causing the reproduced sound waves to more nearly conform in quality and character of tone, with those sounds which are reproduced upon the record.

If it be desired to increase or diminish the volume of the sound waves reproduced, the point of engagement of the spring $p$ with the post $o$ may be lowered or raised to simultaneously increase or decrease the pressure upon both the stylus or reproducer point and the diaphragm. If the pressure upon the stylus or reproducer point has reached the maximum consistent with the minimum of wear upon the record, and it be desired to still further increase the volume of reproduced sound waves, the angle of the downward projection of the member $i$ may be decreased by tensioning the springs $r\ s$, with a resultant increase in the tension of the diaphragm $h$, or if desired the extent of projection of the stylus or reproducer point may be increased or diminished by adjusting it in its mount $j$ with a similar variance in the volume of the reproduced sound waves.

As heretofore stated, the member $i$ in following the record, rotates in its entirety about the strand $h^2$, the flexibility of which permits this movement of said arm, the position of said arm relative to the diaphragm and the record being controlled by the member $m$ which has universal movement to permit the free movement of the member $i$.

The springs $r$—$s$ are provided with flexible washers which in conjunction with the pad $n'$ not only prevent the transmission of vibrations, passing through the member $i$, to the said springs and to the arm $m$, but also prevent the sympathetic vibrations in any parts of the machine other than the said members $i$ and $h^2$ and the said diaphragm.

I have found in actual practice that the construction herein described results in a machine running so smoothly as to avoid the development of practically all sounds except those emanating from the diaphragm, much of that scratching and most of those blasts, found in the ordinary phonograph, being entirely eliminated.

It is not my intention in this application to claim broadly a system in phonographs including a tensioned diaphragm and a nonpivotal transmitter member, such having been made the subject matter of another application of mine pending concurrently herewith.

Having described my invention what I claim as new and desire to have protected by Letters Patent is:—

1. In a phonograph, means movably supporting a record, a diaphragm, a vibrator or transmitter member, one end of which is connected with said diaphragm and the other end of which carries a stylus or reproducer point, a controlling arm, one end of which is universally mounted in axial alinement with the axis of said diaphragm and the other end of which is connected to, and movable with said vibrator or transmitter member at a point intermediate the ends thereof, and means exerting constant, substantially uniform pressure upon said arm whereby pressure is applied to said arm to simultaneously tension said diaphragm and press said stylus or reproducer point upon the record.

2. In a phonograph, means movably supporting a record, a diaphragm, a vibrator or transmitter member, one end of which is connected with said diaphragm and the other end of which carries a stylus or reproducer point, a controlling arm, one end of which is universally mounted in axial alinement with the axis of said diaphragm and the other end of which is connected to, and movable with, said vibrator or transmitter member at a point intermediate the ends thereof, a pendent post carried by said arm, and a spring extending from said post to a point below said diaphragm whereby a constant, substantially uniform pressure is applied to said arm to simultaneously tension said diaphragm and press said stylus or reproducer point into intimate contact with the record.

3. In a phonograph, means movably supporting a record, a diaphragm, a vibrator or transmitter member, one end of which is connected with said diaphragm and the other end of which carries a stylus or reproducer point, a controlling arm, one end of which is universally mounted in axial alinement with the axis of said diaphragm and the other end of which is connected to, and movable with, said vibrator or transmitter member at a point intermediate the ends thereof, a pendent post carried by said arm, and a spring extending from said post to a point below said diaphragm whereby a constant, substantially uniform pressure is applied to said arm to simultaneously tension said diaphragm and press said stylus or reproducer point into intimate engagement with the record, said post being provided with means whereby the point of engagement of the spring therewith may be varied to vary the leverage at which pressure is exerted upon said arm.

4. In a phonograph, means movably supporting a record, a diaphragm, a vibrator or transmitter member, one end of which is connected with said diaphragm and the other end of which carries a stylus or reproducer point, a controlling arm, one end of which is universally mounted in axial alinement with the axis of said diaphragm and the other end of which is forked to provide divergent arms adjacent to the stylus or reproducer point, a plate having a collar encircling said vibrator or transmitter member and secured to said forked ends whereby said member is held against rotative movement and said arm and said member act in unison, and means exerting constant, substantially uniform pressure upon said arm whereby pressure is applied to said arm to simultaneously tension said diaphragm and press said stylus or reproducer point upon the record.

5. In a phonograph, means movably supporting a record, a diaphragm, a vibrator or transmitter member, one end of which is connected with said diaphragm and the other end of which carries a stylus or reproducer point, a controlling arm, one end of which is universally mounted in axial alinement with the axis of said diaphragm and the other end of which is forked to provide divergent arms adjacent to the stylus or reproducer point, a plate having a collar encircling said vibrator or transmitter member and secured to said forked ends whereby said member is held against rotative movement and said arm and said member act in unison, adjustable means connecting said plate with said forked ends whereby said plate may be tilted to vary the angle of projection of the transmitter relative to said arm and said diaphragm, and means exerting constant, substantially uniform pressure upon said arm whereby pressure is applied to said arm to simultaneously tension said diaphragm and press said stylus or reproducer point upon the record.

6. In a phonograph, means movably supporting a record, a diaphragm, a vibrator or transmitter member, one end of which is connected with said diaphragm and the other end of which carries a stylus or reproducer point, a controlling arm, one end of which is universally mounted in axial alinement with the axis of said diaphragm and the other end of which is forked to provide divergent arms adjacent to the stylus or reproducer point, a plate having a collar encircling said vibrator or transmitter member and secured to said forked ends whereby said member is held against rotative movement and said arm and said member act in unison, adjustment screws carried by said fork and passing through said plate, springs interposed between said screws and the top of said plate and between said plate and said fork, said springs encircling said screws, the ends of said springs bearing upon opposite sides of said plate whereby the compression of said springs under said screws results in a tilting action of said plate under constant pressure, and means exerting constant, substantially uniform pressure upon said arm whereby pressure is applied to said arm to simultaneously tension said diaphragm and press said stylus or reproducer point upon the record.

7. In a phonograph, the combination with a stationary sound box having an outlet opening therein, a tubular member projecting vertically from said sound outlet, and a diaphragm within said sound box, of an incased horn having its inlet adjacent to said sound box, and a rigid tubular U-shaped member, the opposite ends of which are adapted to be respectively detachably connected with said first named tubular member and the inlet of said horn, whereby said last named tubular member may be used to project the sound waves into said incased horn, or may be removed to permit the use of an exposed horn in conjunction with said first named tubular member.

In witness whereof, I have hereunto affixed my signature, in the presence of two witnesses, this 16th day of December, 1910.

CLINTON B. REPP.

Witnesses:
T. T. WENTWORTH,
P. FRANK SONNEK.